Sept. 28, 1926.　　　L. C. VANDERLIP　　　1,601,090
MOTOR VEHICLE LOCK
Filed Oct. 15, 1925
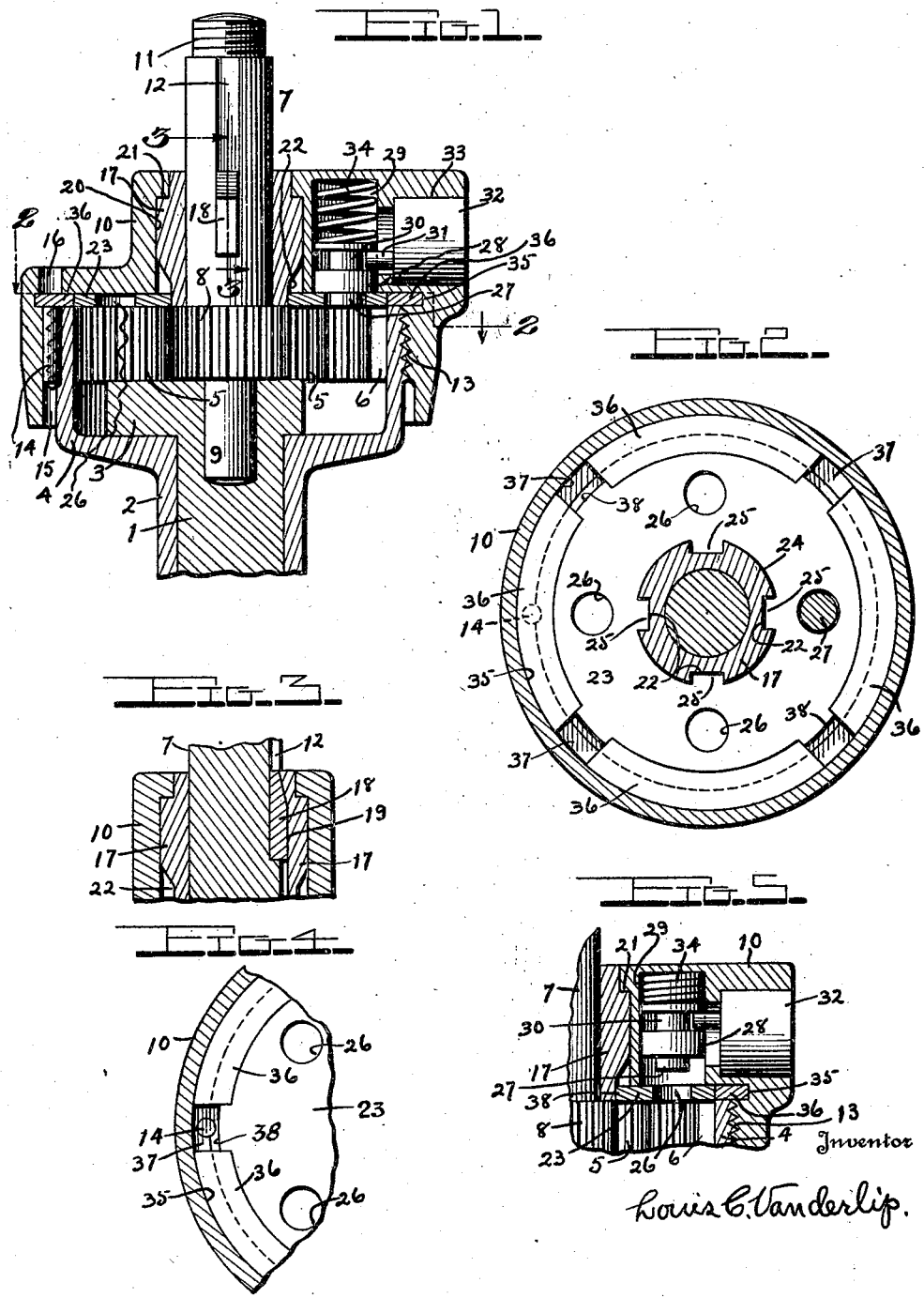
Inventor
Louis C. Vanderlip.

Patented Sept. 28, 1926.

1,601,090

UNITED STATES PATENT OFFICE.

LOUIS C. VANDERLIP, OF ELKHART, INDIANA.

MOTOR-VEHICLE LOCK.

Application filed October 15, 1925. Serial No. 62,516.

This invention relates to motor car steering mechanism, and especially to locking means therefor.

An object of this invention is to provide a steering post and steering wheel lock for a motor car of the Ford type in which planetary gearing is used in the steering head.

Another object of the invention is to provide a steering wheel lock for a car of the Ford type in which the steering wheel is rendered non-rotatable when locked against unauthorized use.

A third object of the invention is to provide a so-called "rigid wheel" lock for the Ford motor car in which the stock Ford steering wheel shaft may be used, thereby eliminating the necessity for building a special shaft.

Still another object is to provide lock controlled means for preventing the removal of the pin which locks the planetary gear housing cap to the lower housing of the steering head of a motor car of the Ford type. Other and more specific objects are mentioned and described herein.

The preferred embodiment of my invention is illustrated in the accompanying drawing in which Figure 1 is a section in elevation through the steering head of a Ford motor car showing the invention applied thereto, and illustrating the parts in the locked position; Fig. 2 is a section taken on the line 2—2 of Fig. 1; Fig. 3 is a fragmental section taken on the line 3—3 of Fig. 1; Fig. 4 is a fragmental view illustrating the exposure of the housing cap locking pin to enable authorized removal of the locking pin and thereby the housing cap; and Fig. 5 is a fragmental view illustrating the retracted position of the locking bolt.

Similar numerals of reference indicate like parts throughout the several views on the drawing.

Referring to the drawing in detail, the numeral 1 indicates the top end of the usual steering post of a Ford motor car, said post being rotatably arranged within the usual hollow steering column 2, and provided with the usual head 3 which is arranged within the usual cup-like planetary gear housing 4 rigid with the top end of the column 2. Numerals 5, 5 indicate two of the three usual driven gears of the planetary, said gears being mounted upon the post head 3 in the well known manner and meshing with the usual annular interior rack element 6 formed on the housing 4 for steering post actuation, as is well known.

The numeral 7 indicates generally the steering wheel shaft of the device which carries the usual sun-gear 8 rigid therewith, the latter meshing with the gears 5, said shaft being provided also with a cylindrical lower end 9 which is journaled in the steering post 1, as is well known. As illustrated, the shaft 7 represents the stock steering wheel shaft of the Ford motor car, and the use and application thereof enables the production of a very cheap and rugged locking device. And as illustrated the upper end of the shaft 7, which is cylindrical, extends through a central opening in the housing cap 10 and may carry a steering wheel thereon, as is well known, the extreme top end 11 being screw threaded to receive a wheel retaining nut—not shown.

The shaft 7 is provided with the longitudinal key-way 12 which extends from the top end thereof toward the sun-gear 8 terminating just above the latter, and the key which secures the steering wheel to the shaft is adapted to engage said key-way for a portion of its length.

The housing cap 10 is a cup-like element the skirt whereof is interiorly screw threaded for application to the screw threads 13 formed on the exterior of the housing 4. It is important that the cap 10 be locked against unauthorized removal, and likewise important that said cap may be easily removed by an authorized person. And this invention accomplishes both of the objects mentioned above, said cap being locked to the housing 4 by a hardened steel pin 14 driven into a slot formed transversely of and in the housing threads 13 and projecting into a co-operating slot 15 formed in the threads of the skirt of the cap 10, said pin being driven through an opening 16 formed in the upper wall of said cap.

The numeral 17 indicates a hollow cylindrical collar encompassing the shaft 7 and rigidly keyed thereto by a key 18 which engages both shaft key-way 12 and a corresponding key-way 19 formed in the bore of the collar 17. The collar 17 is rotatable in the chamber 20 formed in the cap 10 and may be provided with an annular shoulder 21 adapted to engage a corresponding shoulder in the cap to prevent upward axial movement of the shaft 7, said collar being extended downward into close proximity with the sun-gear 8. The lower end of the collar 17 may be provided with a plurality of spaced longitudinal slots or key-ways 22 about which is arranged the annular locking disk 23, the latter being bored centrally at 24 to encompass said collar, said disk bore being provided with a circular series of spaced locking lugs 25 which project into the collar slots 22, whereby the two elements—collar and the disk—may be rigidly secured together.

The numeral 26 indicates a circular series of locking bolt sockets formed in the disk 23 and arranged about the collar 17, any one of which sockets may be engaged by the point 27 of the cylindrical locking bolt 28 reciprocally arranged in the bolt chamber 29 formed in cap 10 and preferably adapted for movement parallel with the axis of the shaft 7, whereby the shaft 7 and cap 10 may be directly interlocked to prevent rotation of said shaft.

The locking bolt 28 may be provided with a circumferential groove 30 into which the cam pin 31 of the key controlled cylinder lock 32 engages. The lock 32 may be any suitable type of tumbler lock suitably mounted in a chamber 33 formed in the cap 10, the cam pin of said lock being arcuately movable by manipulation of the lock cylinder by a key, as is well known, whereby the locking bolt 28 may be actuated into and out of engagement with one of the disk sockets 26. A coil tension spring 34 may bear against the bolt 28 to facilitate downward movement of the bolt and to hold same in engagement with one of the sockets 26.

The numeral 35 indicates an annular chamber within the cap 10 and extending radially beyond the housing threads 13 and with which the opening 16 communicates and through which the pin 14 is driven when cap 10 is locked to the housing, as described. Within the chamber 35 and in a plane immediately above the pin 14 a plurality of segmental guard or screen plates 36, 36 are arranged and extending about the outer periphery of the disk 23, said plates having their ends spaced apart at 37, into which spaces the radially projecting lugs 38, formed integral with disk 23 on the outer periphery thereof, project to maintain such spaced relation of said plates. The disk lugs 38 function also to rotate the plates 36 when the shaft 7 is rotated, being always under the control of an authorized operator of the motor car. The spaces 37 are so arranged in relation to the bolt sockets 26 that the pin 14 is always concealed by one of said plates 36 when the bolt 28 is in engagement with one of the sockets 26, whereby unauthorized access to the top end of the locking pin 14 is prevented, Fig. 2. When the operator desires to remove the housing cap 10 the wheel shaft 7 is rotated until one of the spaces 37 registers with the opening 16, when the pin 14 may be driven out of engagement with the cap and housing screw threads by the use of a pointed tool.

I claim:—

1. In mechanism for preventing the operation of the steering mechanism of a vehicle, the combination of a two part stationary housing, a steering wheel shaft extending through and journaled in said housing, a collar rigidly secured about said wheel shaft within said housing, a plate encompassing said collar and rigid therewith, said plate being provided with a circular series of bolt sockets arranged around said collar, and lock controlled means adapted to engage one of said bolt sockets to prevent rotation of said shaft.

2. In mechanism for preventing the operation of the steering mechanism of a vehicle, the combination of a stationary gear housing, a cap screw threaded about said housing, means engaging said housing and cap screw thread connection to prevent removal of the cap from the housing, a shaft extending through the cap and journaled in the housing, a locking disk encompassing said shaft within said housing cap and movable with the shaft, lock controlled means to render said shaft inoperative, and movable means within said housing cap and actuated by said locking disk, whereby said means to prevent removal of the housing cap is rendered alternately accessible and inaccessible.

3. In mechanism for preventing the operation of the steering mechanism of a vehicle, the combination of a stationary gear housing, a cap screw threaded about said housing, means engaging said housing and cap screw thread connection to prevent the removal of the cap from the housing, a shaft extending through the cap and journaled in the housing, a locking disk encompassing said shaft within said housing cap and rotatable with said shaft, lock controlled means to render said shaft inoperative, and movable means within said housing cap, encompassing said disk and actuated thereby, whereby said means to prevent removal of the housing cap is rendered alternately accessible and inaccessible.

4. In mechanism for preventing the operation of the steering mechanism of a vehicle, the combination of a stationary gear housing, a cap screw threaded about said housing, said cap having an interior chamber arranged above said housing and cap screw thread connection, means engaging said housing and cap screw thread connection to prevent the removal of the cap from the housing, said means being accessible from said cap chamber, a shaft extending through the housing cap and adapted to carry a steering wheel, said shaft being journaled in said housing, lock controlled means to render said shaft alternately operative and inoperative, and movable means arranged in said cap chamber and actuated by said shaft, whereby said means to prevent the removal of the housing cap is rendered alternately removable and irremovable, said means being provided with an aperture which, when brought into registration with said means engaging said cap and housing screw thread connection, enables the removal of the latter from said screw thread connection.

5. In a steering gear for vehicles, the combination with steering gear including a rotary steering post, a housing mounted relatively thereto, and driven gears in said housing for steering post actuation, of a cap screw threaded about said housing and provided with an annular chamber which is arranged above said screw thread connection between the housing and cap, detent means engaging said cap and housing screw thread connection to prevent the removal of said cap from the housing, a shaft extending through said cap and provided with a gear which is in mesh with said driven gears, a disk encompassing said shaft and rotatable therewith, lock controlled means mounted in said housing cap adapted to engage said disk to render said shaft alternately operative and inoperative, and a movable element arranged in said cap chamber adjacent said detent means and actuated by said disk, whereby said detent means is rendered alternately removable and irremovable.

6. In a steering device for vehicles, the combination with steering gear including a rotary steering post, a housing mounted relatively thereto, and driven gears in said housing for steering post actuation, of a cap removably secured about said housing, detent means to prevent the removal of said cap from the housing, a shaft extending through said cap and provided with a gear which is in mesh with said driven gears, circularly movable means within the housing cap and actuated by said shaft, whereby said detent means is rendered alternately removable and irremovable, and lock controlled means to render said shaft alternately rotatable and non-rotatable.

7. In a steering device for vehicles, the combination with steering gear including a rotary steering post, a housing mounted relatively thereto, and driven gears in said housing for steering post actuation, of a cap removably secured about said housing, detent means to prevent the removal of said cap from the housing, a shaft extending through said cap and provided with a gear which is in mesh with said driven gears, means concentric with the shaft, arranged within the housing cap and actuated by said shaft, whereby said detent means is rendered alternately removable and irremovable, and lock controlled means to render said shaft alternately rotatable and non-rotatable.

8. In mechanism for preventing the operation of the steering mechanism of a vehicle, the combination of a planetary gear housing, an apertured cap therefor, a steering wheel shaft extending through said cap aperture and journaled within said housing, a collar rigidly secured about said wheel shaft within said cap and provided with a shoulder adapted to engage said housing cap to prevent axial movement of said wheel shaft, a disk encompassing said collar and rigid therewith, said disk being provided with a circular series of bolt sockets arranged around said collar, and a lock controlled bolt mounted in said housing cap and adapted for movement into one of said disk bolt sockets for holding said wheel shaft against rotary movement.

9. In mechanism for preventing the operation of the steering mechanism of a vehicle, the combination of a stationary gear housing, a cap screw threaded about said housing, means engaging said housing and cap screw thread connection to prevent the removal of the cap from the housing, a shaft extending through the cap and journaled within said housing, a locking disk encompassing said shaft within said housing cap and rotatable with said shaft, said disk being provided with a bolt socket, a lock controlled bolt mounted in said housing cap and adapted for movement into said disk bolt socket to prevent rotary movement of said wheel shaft, and a plurality of guard plates encompassing said disk and operatively connected therewith, whereby said means to prevent removal of said housing cap is rendered alternately removable and irremovable.

10. In a steering gear for vehicles, the combination with steering gear including a rotary steering post, a housing mounted relatively thereto, and driven gears in said housing for steering post actuation, of a housing cap screw threaded about said housing and provided with an annular chamber which is arranged above said housing and cap screw thread connection, said chamber being provided with an aperture opening to the housing cap exterior, a detent stud engaging said cap and housing screw thread connection to prevent removal of said cap from the housing, said stud being insertable through said cap chamber aperture, a steering wheel shaft extending through said cap and provided with a gear which is in mesh with said driven gears, a disk encompassing said shaft and rotatable therewith, lock controlled means adapted to engage said disk to render said shaft alternately operative and inoperative, and a plurality of spaced guard plates movably arranged in said cap chamber about said shaft, said guard plates being operatively connected with said disk, whereby rotation of said shaft renders said detent stud alternately removable and irremovable.

In witness whereof I have hereunto affixed my signature this 13th day of October, 1925.

LOUIS C. VANDERLIP.